(12) United States Patent
West

(10) Patent No.: US 6,566,421 B1
(45) Date of Patent: May 20, 2003

(54) LOW WATER, HIGH-SOLIDS, LOW SOLVENT FLOORING ADHESIVE

(75) Inventor: William Osborne West, Oneida, TN (US)

(73) Assignee: Triangle Pacific Corp., Addison, TX (US)

( * ) Notice: Subject to any disclaimer, the term of this patent is extended or adjusted under 35 U.S.C. 154(b) by 0 days.

(21) Appl. No.: 09/418,859

(22) Filed: Oct. 15, 1999

(51) Int. Cl.$^7$ .............................. C09J 101/00; C09J 4/00
(52) U.S. Cl. ................... 523/177; 524/272; 524/425; 524/436; 524/445; 524/437; 524/522
(58) Field of Search .................... 524/270, 271, 524/272, 499, 425, 436, 445, 437, 444, 522, 523, 524; 523/169, 171, 177

(56) References Cited

U.S. PATENT DOCUMENTS

| | | |
|---|---|---|
| 3,615,975 A | 10/1971 | Gillern et al. |
| 4,123,305 A | 10/1978 | Krzeszowski |
| 4,259,470 A | 3/1981 | Trotter et al. |
| 4,654,388 A * | 3/1987 | Lofgren ............... 524/272 |
| 5,055,209 A * | 10/1991 | Bridges et al. ......... 252/8.51 |
| 5,196,468 A * | 3/1993 | Schwerzel et al. ..... 524/272 |
| 5,804,019 A | 9/1998 | Sweet et al. |

OTHER PUBLICATIONS

Wood & Wood Products; "Wood Tile Firm Improves Product with New Adhesive System"; All pages; Oct., 1988.
Bruce Hardwood Floors; "How to Install"; All pages; 1992.
Premier Wood Floors and the Wood Wizard Present; "Wood Magic"; pp. 11–15, 35–40, 47–48, 58–63, and 80–85; Jan. 15, 1995.
Bruce Hardwood Floors; "Installers Handbook"; pp. 6, 7, 56–58 and 62; 1994.

* cited by examiner

Primary Examiner—James J. Seidleck
Assistant Examiner—U. K Rajguru
(74) Attorney, Agent, or Firm—Adams, Evans, P.A.

(57) ABSTRACT

A reduced density, low water, high-solids flooring adhesive, comprising an intimately blended mixture of between 10 percent and 20 percent by weight of a high solids acrylic polymer characterized by having at least 70 percent by weight solids, between 10 percent and 20 percent of a tackifying resin for increasing initial adherence of the adhesive to the flooring, between 40 percent and 60 percent filler, between 0.25 and 2 percent of a gas, wherein the total amount of solids is no less than 80 percent by weight. The gas may be the decomposition product of hydrogen peroxide introduced into the adhesive during mixing.

11 Claims, No Drawings

LOW WATER, HIGH-SOLIDS, LOW SOLVENT FLOORING ADHESIVE

TECHNICAL FIELD AND BACKGROUND OF THE INVENTION

This invention relates to an adhesive adapted for use in adhering a flooring product to a subfloor. The adhesive is particularly suitable bonding hardwood flooring products, such as laminated and solid hardwood planks, strips and blocks to, for example, plywood, oriented strand board (OSB), and concrete subfloors. The adhesive is characterized by having reduced density, enhanced homogeneity, reduced cost and improved spreadability.

The adhesive, which will be supplied to the installer in the form of a spreadable mastic, is intended as a substitute for conventional chlorinated solvent adhesives which have been or will be banned, and for water-based adhesives which have relatively high water content. The most popular chlorinated adhesives, such those containing 1,1,1, trichloroethane, contain no water and provide a permanent and aggressive bond between the flooring product and subfloor. However, they are messy to apply, expensive and have an unpleasant odor. Present water-based mastics, including one made by applicant, have between 20–40 percent water. When wooden flooring is applied to the mastic, the water soaks into the back of the wood, causing dimensional changes such as separation and lifting of adjacent flooring elements. While these conditions may under optimum conditions disappear over time, such water-based adhesives are in any event generally less tacky and not as aggressive as solvent-based adhesives.

A desirable mastic adhesive should have low water content of approximately 10 percent or lower. The mastic should also have moderate strength—approximately 25–30 lb/in$^2$ when fully cured, high flexibility and be rebondable to itself for about one week. Other desirable characteristics include environmental safety, easy application, low odor, and quick initial bonding. Further explanation and discussion of the advantages of the new ashesive according to this application are set out below.

The adhesive is based generally on the use of high-solids acrylic and vinyl-acetate ethylene polymers in combination with one or more tackifiers.

According to the invention, a gas-producing agent such as hydrogen peroxide is introduced into the mastic adhesive during manufacture. The hydrogen peroxide reduces the density of the mastic without affecting is strength, improves spreadability and assists in homogenizing the mixture.

SUMMARY OF THE INVENTION

Therefore, it is an object of the invention to provide a flooring adhesive which has a low water content and reduced density.

It is another object of the invention to provide an adhesive which is environmentally safe.

It is another object of the invention to provide an adhesive which is easier to spread.

It is another object of the invention to provide and adhesive which has enhanced homogeneity.

It is another object of the invention to provide an adhesive which is lower in density.

It is another object of the invention to provide an adhesive which has strength sufficient to permanently bond with and support a flooring product on a subfloor.

It is another object of the invention to provide and adhesive which retains a high degree of flexibility when fully cured.

It is another object of the invention to provide an adhesive which has low odor characteristics.

It is another object of the invention to provide an adhesive which quickly forms a bond.

It is another object of the invention to provide an adhesive which will rebond for an extended period of time.

It is another object of the invention to provide an adhesive which forms an aggressive bond when cured.

It is another object of the invention to provide an adhesive which retains a rubbery, flexible condition when fully cured.

These and other objects, of the present invention are achieved in the preferred embodiments disclosed below by providing a reduced density, low water, high-solids flooring adhesive, comprising an intimately blended mixture of between 10 percent and 20 percent by weight of a high solids acrylic polymer characterized by having at least 70 percent by weight solids, between 10 and 20 percent vinyl-acetate ethylene, between 10 percent and 20 percent of a tackifying resin for increasing initial adherence of the adhesive to the flooring, between 40 percent and 60 percent filler, between 0.25 and 2 percent of a gas, wherein the total amount of solids is no less than 80 percent by weight.

According to one preferred embodiment of the invention, the adhesive includes between five percent and ten percent of a solvent.

According to another preferred embodiment of the invention, the adhesive includes an effective amount of an emulsifier and a plasticizer.

According to yet another preferred embodiment of the invention, the filler is selected from the group consisting of calcium carbonate, barium sulfate, and hydrated aluminum silicate.

According to yet another preferred embodiment of the invention, the gas is formed as a decomposition product of hydrogen peroxide.

According to yet another preferred embodiment of the invention, the hydrogen peroxide is initially present during mixing at a rate of 0.5 percent by weight of the adhesive.

According to one preferred embodiment of the invention, a low water, high-solids, solvent-free content flooring adhesive is provided, comprising an intimately blended mixture of between 10 percent and 20 percent by weight of a high solids acrylic polymer characterized by having at least 70 percent by weight solids, between 10 percent and 20 percent of a tackifying resin for increasing initial adherence of the adhesive to the flooring, between 40 percent and 60 percent filler, and a gas formed as a decomposition product of hydrogen peroxide, an effective amount of an emulsifier, and an effective amount of a plasticizer, wherein the total amount of solids is no less than 80 percent by weight.

According to yet another preferred embodiment of the invention, the acrylic polymer comprises 16 percent by weight, the tackifying resin comprises between 10 and 11 percent by weight, the filler comprises 51 percent by weight.

According to yet another preferred embodiment of the invention, the density of the adhesive is approximately 13 pounds/gallon.

According to yet another preferred embodiment of the invention, the total amount of solids is no less than 80 percent by weight.

DESCRIPTION OF THE PREFERRED EMBODIMENT AND BEST MODE

The adhesive according to the various embodiments of the present invention includes a high solids acrylic polymer, such as XPD-2658 manufactured by BFGoodrich Specialty Chemicals. This product is intended for coatings and adhesives where a thick film is desirable.

| Total Solids (percent) | 78–82 |
| --- | --- |
| pH | 5.6–6.3 |
| Brookfield Viscosity (cPs on Brookfield HB Model) | |
| @ 1 rmp | 500,000 to 1,500,000 |
| @ 10 rpm | 100,000 to 250,000 |
| @ 20 rpm | 50,000 to 150,000 |
| Mean Particle Size (microns) | 1.5 |
| Density (Lbs/gal.) | 8.9 |
| $T_g$ (° C.) | −23 to −27 |

The adhesive according to a preferred embodiment of the invention also includes a high-solids vinyl acetate-ethylene copolymer made by Air Products and Chemicals, Inc. and sold under the name Airflex 7200. Its physical properties are as follows:

| Total Solids (percent) | 73 +/− 1 |
| --- | --- |
| pH | 4.0–5.5 |
| Brookfield Viscosity (RVF Viscometer at 77° F. @ 20 rpm) | 1,500–3,000 |
| $Tg^3$ | 0° C. |

The third principal element of the preferred embodiments of the invention is a tackifier resin, which may be one of several, such as Aquatac 9027, Aquatac 9041, and Nevtac 4100.

As will be seen below, there are various embodiments of the invention which vary principally by the addition of various other compositions or materials to enhance various aspects of the performance of the adhesive.

EXAMPLE NO. 1

| COMPONENT (WT percent) | RANGE | PRE-FERRED | SO-LIDS | WA-TER | SOL-VENTS |
| --- | --- | --- | --- | --- | --- |
| ACRYLIC POLYMER (BFG XPD 2658) | 10–20 | 15.64 | 12.5 | 3.13 | — |
| VINYL-ACETATE ETHYLENE (AIR PRODUCTS (7200) | 10–20 | 15.64 | 11.3 | 4.38 | — |
| TACKIFYING RESIN (AQUATAC 9041) | 0–20 | 10.59 | 9.5 | .42 | .60 |
| PROPYLENE GLYCOL | 2–5 | 1.93 | — | .09 | 1.93 |
| CYPAR 9 | 2–6 | 3.85 | — | — | 3.85 |
| CA 897 (EMULSIFIER) | 5–10 | 3.85 | 75 | 25 | |
| 10% H2O2 SOL | 0.25–2 | 0.5 | — | .5 | — |
| BARIUM SULFATE | 0–20 | 37.06 | 37.06 | — | — |
| LIMESTONE (CALCIUM CARBONATE) | 10–20 | 14.31 | 14.31 | — | — |
| TOTAL | | 100 | | | |

As is shown above, the adhesive has total solids of approximately. 85 percent, total water of approximately 8.5 percent and total solvent of 6.5 percent.

There are numerous suitable tackifying resins, for example, Aquatac 9041, Aquatac 9027 and Aquatac 5051, each manufactured by Arizona Chemical Company of Panama City, Fla. These products contain a proprietary rosin ester, dimethylanminoethanol (DMEA) and a small amount of water.

It has been determined that a solvent such as Shell CYPAR 9® is a suitable solvent. This solvent has lower volatile organic compounds than comparable solvents and relatively low hazardous air pollutants. The range of use may preferably be as low as 2–3 percent to as high as 6 percent.

The barium sulfate and limestone (calcium carbonate) are both fillers.

The addition of hydrogen peroxide during mixing introduces oxygen gas in the form of minute bubbles into the mixture. Hydrogen peroxide ($H_2O_2$). has a molecular weight of 34.02, is composed of 5.94 percent Hydrogen and 94.06 percent oxygen and is miscible in water. Hydrogen peroxide is unstable, and easily decomposes into water and oxygen when contacted by a wide range of materials. Its rapid decomposition during agitation with the other parts of the adhesive mixture make it an ideal composition for introducing gas into the mixture. A 10 percent solution of hydrogen peroxide in water formed by mixing 22.54 percent of a 35 percent $H_2O_2$ solution with 77.46 percent water provides rapid decomposition.

The hydrogen peroxide also makes the mixture more stable while mixing takes place. The bubbles are uniformly distributed throughout the mixture and reduce the density of the mixture by approximately 7 percent. Thus, a mixture which would ordinarily weigh approximately 14 pounds per gallon instead weighs 13 pounds per gallon. The bubbles cause the mixture to be somewhat "fluffy", improving speadability. Application rates are the same, meaning a cost reduction of 7 percent based solely on introduction of the gas into the mixture.

Laboratory batch trials have shown that adhesive described above has excellent rebondability. This feature allows the installer to fix hollow spots and correct perimeter lifting over an extended period of time of up to 4–7 days. Generally, a water-based adhesive becomes firmly set with one to two days, and any hollow spots must be weighted before this setting takes place. This invention allows one to find any areas which need weighting and to carry out this procedure for up to a week after installation with excellent results. The weight can be applied and maintained for an extended period of time sufficient to achieve a complete and sure bond.

When fully cured the adhesive is flexible, tough and sure, retaining a rubbery consistency. It does not harden or become brittle. The floor can thus shift and move with moisture change without the adhesive cracking or separating from the floor.

Application of the adhesive to subflooring is conventional. The adhesive has the consistency of conventional mastic-type adhesives and is applied with a notched trowel to a layer of between 1/16th to 3/32nds inch thick (approximately 50–55 sq./ft/gal). Areas can be built up to greater thicknesses if necessary to even out irregularities in the subfloor.

An adhesive adapted for use in adhering a flooring product to a subfloor is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A reduced density, low water, high-solids flooring adhesive, comprising an intimately blended mixture of:

(a) between 10 percent and 20 percent by weight of a high solids acrylic polymer characterized by having at least 70 percent by weight solids;

(b) between 10 percent and 20 percent of a tackifying resin for increasing initial adherence of the adhesive to the flooring;

(c) between 40 percent and 60 percent filler; and (d) between 0.25 and 2 percent of a gas;

wherein the total amount of solids is no less than 80 percent by weight.

2. An adhesive according to claim 1, and including between five percent and ten percent of a solvent.

3. An adhesive according to claim 1, and including an effective amount of an emulsifier and a plasticizer.

4. An adhesive according to claim 1, wherein said filler is selected from the group consisting of calcium carbonate, barium sulfate, hydrated aluminum silicate, and limestone.

5. An adhesive according to claim 1, wherein said gas is formed as a decomposition product of hydrogen peroxide.

6. An adhesive according to claim 2, 3, or 4, wherein said gas is formed as a decomposition product of hydrogen peroxide.

7. An adhesive according to claim 1, wherein said hydrogen peroxide is initially present during mixing at a rate of 0.5 percent by weight of the adhesive.

8. A low water, high-solids, solvent-free content flooring adhesive, comprising an intimately blended mixture of:

(a) between 10 percent and 20 percent by weight of a high solids acrylic polymer characterized by having at least 70 percent by weight solids;

(b) between 10 percent and 20 percent of a tackifying resin for increasing initial adherence of the adhesive to the flooring;

(c) between 40 percent and 60 percent filler; and (d) a gas formed as a decomposition product of hydrogen peroxide;

(e) an effective amount of an emulsifier; and (f) an effective amount of a plasticizer;

wherein the total amount of solids is no less than 80 percent by weight.

9. An adhesive according to claim 8, wherein:

(a) said acrylic polymer comprises 16 percent by weight;

(b) said tackifying resin comprises between 10 and 11 percent by weight; and (d) said filler comprises 51 percent by weight.

10. An adhesive according to claim 1, 2, 3, 4, 5, 7, 8 or 9, wherein the density of the adhesive is approximately 13 pounds/gallon.

11. A reduced density, low water, high-solids flooring adhesive, comprising an intimately blended mixture of:

(a) between 10 percent and 20 percent by weight of a high solids acrylic polymer characterized by having at least 70 percent by weight solids;

(b) between 10 percent and 20 percent by weight of a vinyl-acetate ethylene;

(c) between 10 percent and 20 percent of a tackifying resin for increasing initial adherence of the adhesive to the flooring;

(d) between 40 percent and 60 percent filler; and (e) between 0.25 and 2 percent of a gas;

wherein the total amount of solids is no less than 80 percent by weight.

\* \* \* \* \*